(12) United States Patent
Baek et al.

(10) Patent No.: US 11,177,939 B2
(45) Date of Patent: Nov. 16, 2021

(54) BLOCKCHAIN SYSTEM INCLUDING A DISTRIBUTED NETWORK OF A PLURALITY OF NODES AND A METHOD FOR ACHIEVING AN AGREEMENT BETWEEN THE PLURALITY OF NODES EXECUTED BY PROCESSORS OF THE BLOCK CHAIN SYSTEM

(71) Applicant: NHN Corporation, Gyeonggi-do (KR)

(72) Inventors: Junghwa Baek, Gyeonggi-do (KR); SeungJae Lee, Gyeonggi-do (KR); Soo Kyoung Seol, Gyeonggi-do (KR); Yoonsun Kye, Gyeonggi-do (KR); Min Tae Kim, Gyeonggi-do (KR); Sin Seok Kim, Gyeonggi-do (KR); Kiho Na, Gyeonggi-do (KR); Wonkeun Lee, Gyeonggi-do (KR); Suhyeon Jeong, Gyeonggi-do (KR); Heetae Lyu, Gyeonggi-do (KR); HeeJae Myeong, Gyeonggi-do (KR)

(73) Assignee: NHN CORPORATION, Gyeonggi-Do (KR)

( * ) Notice: Subject to any disclaimer, the term of this patent is extended or adjusted under 35 U.S.C. 154(b) by 219 days.

(21) Appl. No.: 16/575,309

(22) Filed: Sep. 18, 2019

(65) Prior Publication Data

US 2020/0092085 A1    Mar. 19, 2020

(30) Foreign Application Priority Data

Sep. 18, 2018 (KR) ........................ 10-2018-0111496

(51) Int. Cl.
*H04L 29/06* (2006.01)
*H04L 9/06* (2006.01)
*H04L 9/32* (2006.01)

(52) U.S. Cl.
CPC .......... *H04L 9/0637* (2013.01); *H04L 9/0643* (2013.01); *H04L 9/3265* (2013.01); *H04L 9/3268* (2013.01); *H04L 2209/38* (2013.01)

(58) Field of Classification Search
CPC ... H04L 9/0637; H04L 9/0643; H04L 9/3265; H04L 9/3268; H04L 2209/38;
(Continued)

(56) References Cited

U.S. PATENT DOCUMENTS 9,875,510 B1 * 1/2018 Kasper ................. H04L 67/104
10,360,191 B2 * 7/2019 Christidis ............. H04L 9/3236
(Continued)

FOREIGN PATENT DOCUMENTS

KR     10-2017-0137388         12/2017

OTHER PUBLICATIONS

Satoshi Nakamoto; "Bitcoin: A Peer-to-Peer Electronic Cash System", May 24, 2009, pp. 1-9.

*Primary Examiner* — Mahfuzur Rahman
(74) *Attorney, Agent, or Firm* — Ladas & Parry, LLP

(57) ABSTRACT

A method may achieve an agreement among a plurality of nodes executed by one or a plurality of processors of a blockchain system including a distributed network of the plurality of nodes. The method may comprise: receiving a candidate block in a N-th round (N is a positive integer) by an arbitrary node among the plurality of nodes able to be promoted to producer nodes having a block generation status at a predetermined time for each round, determining whether the received candidate block is a valid candidate block, determining whether the valid candidate block is an unapproved block, and determining whether to vote for approval of the unapproved block by determining whether the unap- (Continued)

proved block is a first received candidate block which is a first received candidate block within the N-th round by the arbitrary node.

20 Claims, 8 Drawing Sheets

(58) Field of Classification Search
CPC . H04L 9/3297; H04L 9/3239; H04L 67/1057; H04L 2463/121
See application file for complete search history.

(56) References Cited

U.S. PATENT DOCUMENTS

| | | | |
|---|---|---|---|
| 10,382,388 B2* | 8/2019 | Li | G06Q 20/0658 |
| 10,679,210 B2* | 6/2020 | Ardashev | G06F 16/219 |
| 10,868,673 B2* | 12/2020 | Mahanta | H04L 9/0637 |
| 10,986,177 B2* | 4/2021 | Basu | H04L 9/0841 |
| 11,044,103 B2* | 6/2021 | Tang | G16H 10/60 |

* cited by examiner

BLOCKCHAIN SYSTEM INCLUDING A DISTRIBUTED NETWORK OF A PLURALITY OF NODES AND A METHOD FOR ACHIEVING AN AGREEMENT BETWEEN THE PLURALITY OF NODES EXECUTED BY PROCESSORS OF THE BLOCK CHAIN SYSTEM

CROSS REFERENCE TO RELATED APPLICATION(S)

This application claims the priority to Korean Patent Application No. 10-2018-0111496, filed on Sep. 18, 2018, which is all hereby incorporated by reference in its entirety.

BACKGROUND

Technical Field

The present disclosure generally relates to a method and system for achieving an agreement among a plurality of nodes on a blockchain including a distributed network of the plurality of nodes.

Related Art

A person called Satoshi Nagamoto introduced the blockchain concept in 2008 as a method for connecting blocks in his article titled "Bitcoin: A Peer-to-Peer Electronic Cash System", which is all hereby incorporated by reference in its entirety. A blockchain may be used as a ledger shared among peers. The content of a block is transparent and open to the public but is resistant to arbitrary modification, which makes a blockchain as an indispensable technology in the cryptocurrency. Nowadays, the blockchain technology is regarded as applicable not only to the cryptocurrency but also to various industrial fields. The blockchain may use a consensus algorithm to share a distributed ledger among individual peers participating in the network and to manage the ledger. In the case of an early blockchain cryptocurrency represented by Bitcoin, a consensus algorithm of Proof of Work (PoW) is used. This algorithm provides an advantage that scalability is readily achieved since peers may participate in a fully distributed network at any time. However, the work of peers for achieving an agreement is competitive and highly energy consuming, which may degrade the overall computing performance. Also, due to the nature of PoW, a network structure requiring compensation for the work of peers is needed, and therefore, PoW may be not suitable for a blockchain system that may not require the concept of a coin or token. Accordingly, improved consensus algorithms such as Proof of Stake (PoS), Delegated Proof of Stake (DPoS), Practical Byzantine Fault Tolerance (PBFT), Casper, and Tendermint, all of which try to overcome the shortcomings of the PoW, are being researched, developed, and applied. Differently from the PoW, the PoS, which operates in a way that a stake determines a block generator, may provide advantages that energy consumption is not involved and a transaction may be processed with a relatively high reliability compared with the PoW. However, like the PoW, the PoS also may have an inherent problem that credibility is lowered if voters with stakes become indifferent to voting. Also, if a fork happens, where a blockchain diverges into two chains, one blockchain is selected through voting based on the stakes. At this time, the nothing a stake problem may occur that nodes do not suffer loss even if the nodes vote for both of the two blockchains. In other words, if an attacker generates a different blockchain in advance and acquires a block generation right, the attacker forces to cause a fork by propagating the blockchain generated in advance. However, in this case, the nodes again choose the safest method of voting for both of the blockchains, which does not cause a loss; as a result, the fork situation may not be resolved after all. The DPoS is a consensus algorithm based on the PoS, which elects a representative and delegates a block generation right to the representative. The DPoS has an advantage that it provides a faster transaction processing speed and better scalability than those of the PoS and further improves credibility of a blockchain. However, the DPoS tends to strengthen centralization of a blockchain network and thus offsets advantages of a distributed network. Also the, DPoS may have a disadvantage that if the participation rate for voting is low, a node may become a delegate even with a low stake, and the DPoS may also be subject to collusion among delegates and DDoS attack to public delegates. The PBFT is a consensus algorithm used for conventional distributed networks, which provide an advantage in that even if a malicious node participates in the network, a consensus may be achieved and the PBFT may also be applied to asynchronous distributed networks. However, since the performance of a blockchain system may be degraded as the number of nodes is increased, the blockchain system may be limited to a few tens of nodes. Casper is a consensus algorithm based on the PoS and PBFT. The Casper is an algorithm developed and used in a blockchain platform called Ethereum, which is currently based on a hybrid structure of the PoW and PoS but will eventually convert the Ethereum to a PoS blockchain. This algorithm may improve credibility of a blockchain by applying two concepts of Justified (authentication) and Finality (final justification) and ensures stability with respect to a situation through a built-in protocol. In particular, the Casper is such an algorithm that resolves the nothing at stake problem, which is one of problems in a PoS blockchain, completeness of which has been theoretically proven. However, the implementation of the Casper algorithm is complicated, and execution speed of which is relatively slow. Tendermint is a consensus algorithm based on the DPoS and PBFT. The Tendermint has a structure in a way that even if a malicious node participates in the network through a process based on the PBFT consensus algorithm, the consensus process may still be continued. Also, since the Tendermint algorithm requires a deposit from block generators participating in a block generation protocol and imposes a penalty on a malicious behavior in the network, it may resolve the nothing at stake problem and improves stability of the network. Unlike the Casper algorithm that emphasizes availability, the Tendermint algorithm may aim to provide much higher reliability. However, a problem inherent in the PBFT algorithm still exists that the network may be delayed due to a malicious use of more than 33% of votes and may break down due to a malicious use of more than 66% of votes.

In addition to the algorithms above, various other consensus algorithms exist, such as Proof of Existence (PoE), Proof of Elapsed Time (PoET), Proof of Importance (PoI), Stellar, and Ethereum PoA (Clique); and various algorithms are derived according to application areas (finance, logistics, distribution, shipping, automotive, data communication, sharing, authentication, and so on) and the purpose of a blockchain system.

It is with respect to these and other general considerations that the following embodiments have been described. Also, although relatively specific problems have been discussed, it should be understood that the embodiments should not be limited to solving the specific problems identified in the background.

PRIOR ART REFERENCES

Patents (Patent 001) Korean Patent Application Publication No. 10-2017-0137388

SUMMARY

Various embodiment of the present disclosure may provide a method and a blockchain system for achieving an agreement among nodes of a blockchain network capable of resolving a unique leader election problem for each round in the conventional leader model and a problem when the elected leader is a malicious leader.

Some embodiments of the present disclosure may provide a method and a blockchain system for achieving an agreement among nodes of a blockchain network capable of preventing a side chain from being generated and capable of ensuring finality.

Certain embodiments of the present disclosure may provide a method and a blockchain system for achieving an agreement among nodes of a blockchain network to obtain fast transaction approval by using network resources efficiently.

According to some embodiments of the present disclosure, a method and a blockchain system for achieving an agreement among nodes of a blockchain network may be robust to a direct attack of an attacker of the network against signer nodes.

Certain embodiments of the present disclosure may provide a system that manages producer nodes through the concepts of round and permission period over time unlike the conventional PBFT consensus algorithm that may not provide a producer node (leader) election rule.

According to some embodiments of the present disclosure, a method for achieving an agreement among a plurality of nodes executed by a processor of a blockchain system composed of a distributed network of the plurality of nodes comprises receiving a candidate block in the N-th round by an arbitrary first node among the plurality of nodes that may be promoted to producer nodes having a block generation status at a predetermined time for each round; determining whether a received candidate block is a valid candidate block; determining whether the valid candidate block is an unapproved block; and determining whether to vote for approval of the unapproved block by determining whether the unapproved block is a first received candidate block, wherein the first received candidate block is a first received candidate block within the N-th round by the first node.

According to another aspect, the method may further comprise transmitting the unapproved block to another node; and transmitting voting information that approves the first received candidate block to other nodes.

According to yet another aspect, the method may further comprise accepting an unapproved block that has obtained more than a predetermined number of votes as an approved block among the unapproved blocks generated in the N-th round.

According to still another aspect, the method may further comprise a step where all of the nodes promoted to producer nodes in the N-th round lose their producer node status in the (N+1)-th round, and a node subsequent to the node that has generated a candidate block accepted as the approved block is promoted to a first producer node in the (N+1)-th round.

According to a still further aspect, the method may further comprise initiating a revote round when an unapproved block that obtains more than a predetermined number of votes does not exist among a plurality of unapproved blocks in the N-th round; and performing a revote for the plurality of unapproved blocks according to predetermined priorities during the revote round, wherein generation of a new candidate block is stopped during the revote round.

According to still yet another aspect, the performing a revote may include performing a revote by a plurality of nodes eligible for voting to approve an unapproved block that has obtained more than a predetermined number of votes among the plurality of unapproved blocks.

According to a still different aspect, the performing a revote may further comprise, in the presence of a plurality of unapproved blocks that have obtained more than a predetermined number of votes among the plurality of unapproved blocks, performing a revote for approval of an unapproved block generated by the first promoted node among those nodes that have generated the plurality of unapproved blocks respectively, wherein the first promoted node is the node with the earliest order of promotion to a producer node in the N-th round.

According to a further different aspect, the determining whether a received candidate block is a valid candidate block may include determining whether to promote a node that has generated the received candidate block; and if the received candidate block is the block that a promoted node has generated, accepting the received candidate block as a valid candidate block.

According to a yet different aspect, the determining whether the valid candidate block is an unapproved block may include determining presence or absence of a subsequent block with a voting result having more than a predetermined number of votes for the valid candidate block; and in the presence of the subsequent block, accepting the valid candidate block as an approved block and requesting the distributed network to perform synchronization with the approved block.

According to a still further different aspect, a plurality of nodes in a status of promotion to producer nodes while a particular round is in progress are promoted according to their order.

According to a still further different aspect, the predetermined number corresponds to ⅔ of the number of the plurality of nodes.

According to a still further different aspect, each of the plurality of nodes has a one-time voting right for each round.

According to a still further different aspect, the method may further comprise receiving voting information by one of the plurality of nodes; verifying validity of received voting information; and propagating voting information verified for validity to other nodes.

According to a still further different aspect, if one of the plurality of nodes receives voting information while a specific round is in progress, it is determined whether a candidate block that has obtained more than a predetermined number of votes exists; and in the presence of a candidate block that has obtained a predetermined number of votes, a consensus is made that an unapproved block that has obtained a predetermined number of votes is accepted as an approved block.

According to a still further different aspect, a method for achieving an agreement among the plurality of nodes executed by a processor of a blockchain system composed of a distributed network of the plurality of nodes comprises promoting an arbitrary second node in the N-th round among the plurality of nodes that may be promoted to producer nodes having a block generation status at a predetermined time for each round; determining whether the second node receives a candidate block before being promoted within the N-th round; if a candidate block is not received by the second node before being promoted, generating a candidate block including voting information within the last block of the blockchain to which a new block is to be connected; voting for accepting a generated candidate block as an approved block; and transmitting the candidate block and voting information to other nodes.

According to a still further different aspect, the method may further comprise receiving, by the second node promoted in the N-th round, a candidate block generated by other node; determining whether a received candidate block is a valid candidate block; determining whether the valid candidate block is an unapproved block; and transmitting the unapproved block to other nodes.

According to a still further different aspect, if the second node receives a candidate block before being promoted, the second node may not generate the new block.

According to a still further different aspect, the new block may be a block that may be agreed on as an approved block based on the number of votes with respect to voting for approving the new block as an approved block in the N-th round.

According to a still further different aspect, a plurality of nodes in a status of promotion to producer nodes while a particular round is in progress are promoted according to their order.

According to a still further different aspect, in a method for achieving an agreement among plurality of nodes on a blockchain composed of a distributed network of the plurality of nodes by generating and propagating consensus data, wherein the consensus data include at least one of candidate block data and voting data, a candidate block including candidate block data that has obtained more than a predetermined number of votes aa an approved block according to the consensus rule, and the approved block is updated on the blockchain.

The consensus rule may include the following rules: a node verifies received consensus data; a node eligible for voting generates voting data approving received candidate block data; a node having a block generation right generates candidate block data; a node generates voting data approving candidate block data generated by the node itself; a node propagates verified consensus data and generated consensus data; a plurality of nodes are promoted to the status of producer node at a predetermined time according to their predetermined order for each round; the status of producer node is maintained until the end of a round at the time of promotion; and candidate block data before promotion to the status of producer node is not received.

According to a still further different aspect, the consensus data include at least one of candidate block data and voting data; a node that has received the consensus data is made to verify the consensus data; a first signer node that has verified the consensus data is made to transmit at least part of the verified consensus data to other nodes; a second signer node that has verified the consensus data is made to generate voting data that approves verified candidate block data; the second signer node is made to transmit at least one of the part of verified consensus data and generated voting data to other nodes; a producer node that has not received the candidate block data before being promoted is made to generate candidate block data; and the producer node is made to generate voting data for approving generated candidate block data.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DESCRIPTION OF EXEMPLARY EMBODIMENTS

Figure 1:
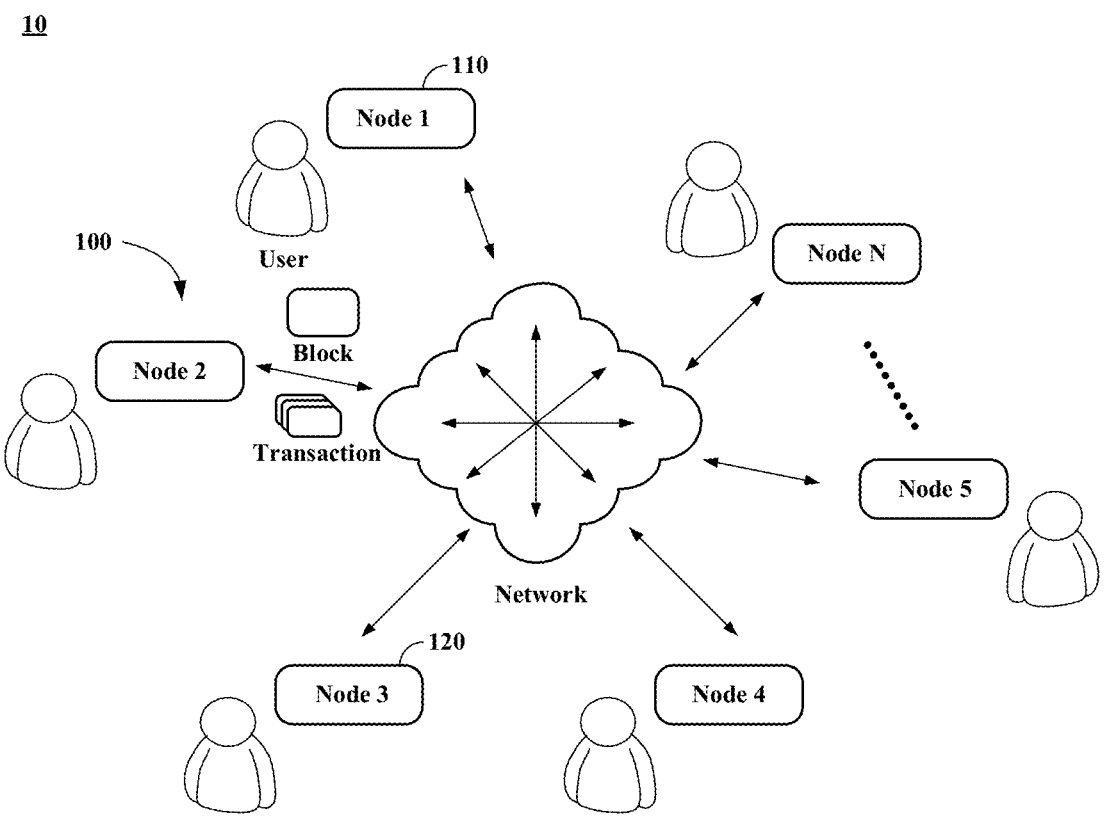
FIG. 1 illustrates a conceptual diagram of a blockchain system including a distributed network of a plurality of nodes according to an embodiment of the present disclosure.

Since the present invention may be modified in various ways and may provide various embodiments, specific embodiments will be depicted in the appended drawings and described in detail with reference to the drawings. The effects and characteristics of the present invention and a method for achieving them will be clearly understood by referring to the embodiments described later in detail together with the appended drawings. However, it should be noted that the present invention is not limited to the embodiment disclosed below but may be implemented in various forms. In the following embodiments, the terms such as first and second are introduced to distinguish one element from the others, and thus the technical scope of the present invention should not be limited by those terms. Also, a singular expression should be understood to indicate a plural expression unless otherwise explicitly stated. The term include or have is used to indicate existence of an embodied feature or constituting element in the present specification; and should not be understood to preclude the possibility of adding one or more other features or constituting elements. Also, constituting elements in the figure may be exaggerated or shrunk for the convenience of descriptions. For example, since the size and thickness of each element in the figure has been arbitrarily modified for the convenience of descriptions, it should be noted that the present invention is not necessarily limited to what has been shown in the figure.

In what follows, embodiments of the present invention will be described in detail with reference to appended drawings. Throughout the specification, the same or corresponding constituting element is assigned the same reference number, and repeated descriptions thereof will be omitted.

Before describing embodiments of the present invention in detail, terms used in the present specification are defined.

Signer node may mean a node having a right or authority for verifying validity of a block. Also, the signer node may be promoted to a producer node.

Producer node may have a right or authority for generating a block. During a permission period, the signer node may be promoted to the producer node. Also, the producer node may function as the signer node.

Permission period may be a time period during which each signer node is promoted to a producer node within a round.

Round may be a unit based on which a block is determined according to a consensus made among nodes. The round may adopt the concept of time along the time axis.

Relative time may be the time measured relatively among individual signer nodes for recognition.

Absolute time may be the actual time shared among all of the signer nodes, which is the absolute time.

Stop the world may be the time at which the network stops operation due to a problem occurred in a block or during a voting propagation process.

Vote may be an expression exchanged among signer nodes to select one valid block (unique block) among candidate blocks generated within one round. For example, if a particular block obtains more than two-thirds (⅔) of the votes, the block may be selected.

Candidate block may be defined as the last block of a chain, which may be finally accepted as an approved block. The candidate block may refer to a block not approved yet, and only one candidate block among candidate blocks generated in each round may be accepted as an approved block.

Approved block may be a finally approved candidate block according to a consensus among candidate blocks.

Canonical block may be a block guaranteed to never be rolled back afterwards. If an approved block is guaranteed to never be rolled back afterwards, the approved block becomes a canonical block. Distinction between approved and canonical blocks may sometimes be ambiguous. In the presence of a second approved block connected subsequently to a first approved block, the first approved block may become a canonical block. If stringency is added in accepting a block as a canonical block, the first approved block may become a canonical block only when two or more approved blocks exist to be connected subsequently to the first approved block.

Parent block may be a block referenced by a particular block, which is located right before the particular block.

Leader block may be a block determined by each node as the most promising to be an approved block among a plurality of candidate blocks generated during a round.

Byzantine node may be a signer node or a producer node that does not follow the rules. The signer or producer node that follows the rules may also be treated as the Byzantine node if it fails to perform the expected function due to system down. An honest signer node has to do its best to prove its honesty. Here, doing the best may indicate that a node which has received consensus data performs all of the computing operations related to verifying validity of the consensus data and propagating the consensus data to other nodes. Also, doing the best may indicate that a node which has generated consensus data performs all of the computing operations related to propagating the consensus data to other nodes. Also, the best amount of computing operations may differ according to the computing power of the node itself.

⅔ of votes may indicate that as many as ⅔ of the nodes eligible for voting exercise the voting right.

Major group may be the highest group of signer nodes that have voted for the same block in a round. At the same time, the major group may refer to the candidate of a canonical group.

FIG. 1 illustrates a conceptual diagram of a blockchain system including a distributed network of a plurality of nodes according to an embodiment of the present disclosure.

The blockchain system 10 described below may be built on a peer-to-peer network architecture. In other words, users participating in the blockchain system 10 may be all given equal positions, no special node may be designated in the network, and all of the nodes (node 1 to node n) may share the role of providing a network service. The plurality of nodes 100 on the network form topologies equivalent to each other and are interconnected in a mesh network. Even if the nodes belonging to the network are at the positions equal to each other, their roles may differ from each other depending on the function supported by the nodes.

Each node is equipped with a routing function within the network and may be equipped with other function. Each node may validate and propagate various data including transactions and blocks and perform the role of maintaining a connection to neighboring nodes. Here, the transaction refers not only to a financial transaction or transaction of virtual currency but also various transactions due to a smart contract. Therefore, it should be noted that the transaction as indicated in the present specification is not limited to a specific transaction.

The users may include various types of entities ranging from ordinary individuals, organizations, communities, up to massive groups.

The nodes 100 connected to the network may comprise a singer node (Node 1) 110 and a producer node (Node 3) 120. The nodes 100 may include a protocol gateway that connects nodes operating other protocol.

To participate in the block system 10, a new node may first search for other nodes existing on the network. To start this process, the new node may search for at least one node pre-existing on the network and connect itself to the searched node. For the new node to be connected to a neighboring node already known, each of the nodes may form a TCP connection to the port of a particular number or to an alternative port. The new node may transmit a connection request message to a neighboring node, and the neighboring node may respond to the corresponding request by transmitting an approval message to the new node if the neighboring node accepts the connection request. After one or more connections have been established, the new node may transmit an address message containing its IP address to its neighboring nodes. Subsequently, the neighboring nodes transmit the received address message to their neighboring nodes, and thereby the newly connected node becomes better known and better connected to other nodes. Also, the newly connected node may request its neighboring nodes to transmit a list of IP addresses of the other neighboring nodes again by transmitting an address request message to its neighboring nodes. Through the aforementioned operation, a node may search for its neighboring nodes connected thereto and broadcast its presence on the network so that other nodes may search for the node itself.

At least part or some of a plurality of nodes 100 may have a copy of the whole blockchain or at least a copy corresponding to a subset of the blockchain.

The blockchain may be realized by a distributed computer system comprising unalterable blocks of transactions. Since each block constituting the blockchain contains a hash of its previous block, blocks are connected altogether and generate records of all transactions initially written to the blockchain. Since a block is tied to previous blocks, disassembly, modification, and reconfiguration of the records are almost impossible. Since blocks are possessed by nodes, the blocks are distributed and robust. In some embodiments, one block records at least one transaction. Transactions are hashed and configured so that forgery or falsification may be prevented from being occurred. Each block and transaction may prevent forgery or falsification by managing hash values and timestamps at the time of data generation and track the history of transactions. Also, with respect to the transaction relationship of a financial means such as virtual currency, the nodes 100 store a blockchain ledger and wallet application, by which a user may perform transactions and other related functions through the network in a secure and reliable manner.

Each node may include a server, interface, system, database, agent, peer, engine, controller, or any other type of computing device operating individually or in a group or may be constructed in an appropriate combination of computing devices so as to read or process computing languages or operational instructions. The computing device may include a processor configured to execute software commands stored in a non-volatile computer-readable storage medium (for example, a hard drive, solid state drive, RAM, flash, and ROM). Preferably, the software commands are organized so that the computing device may provide various functions described herein. Also, some embodiments of the present disclosure may be implemented as a computer program product which includes a non-volatile computer-readable medium storing software commands used by the processor to execute them. Preferably, various servers, systems, databases, and interfaces may exchange data by using HTTP, HTTPS, AES, public/private key exchange, web service, API, financial transaction protocol known to the public, or other electronic standard protocol or algorithm. Preferably, the data exchange may be performed through a packet exchange network, Internet, LAN, WAN, VPN, or any other type of packet exchange network.

Figure 2:
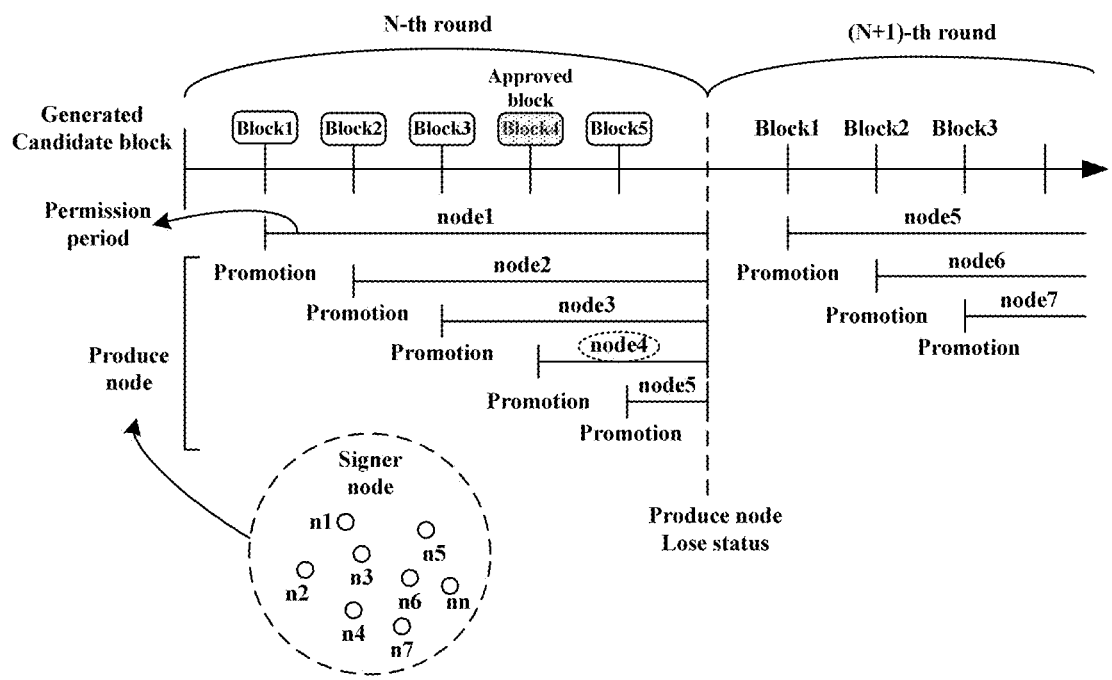
FIG. 2 illustrates a time table showing promotion of nodes over time for illustrating a method for achieving an agreement among a plurality of nodes executed by a processor of a blockchain having a distributed network of the plurality of nodes according to an exemplary embodiment of the present disclosure.
Figure 3:
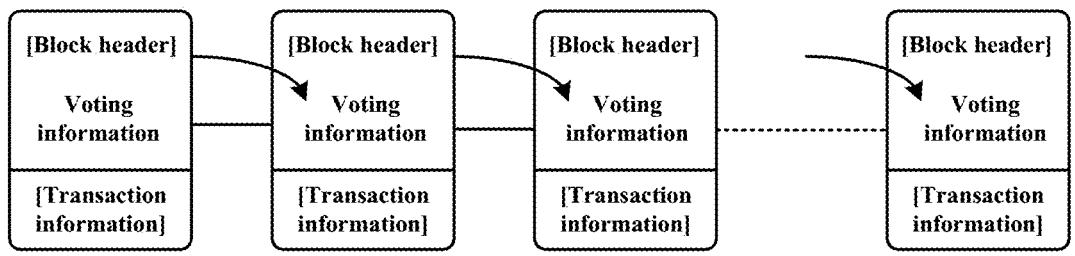
FIG. 3 illustrates types of data recorded in a blockchain according to an exemplary embodiment of the present disclosure.

FIG. 2 illustrates a time table showing promotion of nodes over time for illustrating a method for achieving an agreement among a plurality of nodes executed by a processor of a blockchain having a distributed network of the plurality of nodes according to an exemplary embodiment of the present disclosure, and FIG. 3 illustrates types of data recorded in a blockchain according to an exemplary embodiment of the present disclosure.

In the exemplary embodiment shown in FIG. 2, the blockchain system has the distributed network including a plurality of nodes (n1-nn). The nodes (n1-nn) are nodes assigned as signer nodes. At least some nodes among the signer nodes (n1-nn) may be able to promoted to producer node(s). Each of first to fifth nodes (node1-node5) can be promoted to a producer node at the beginning of its own permission period in order. When the first to fifth nodes (node1-node5) are promoted to the producer nodes, each of the first to fifth nodes (node1-node5) is capable of generating a block. As shown in FIG. 2, the first node (node 1) can generate a first block (Block 1), the second node (node 2) can generate a second block (Block 2), the third node (node 3) can generate a third block (Block 3), the fourth node (node 4) can generate a fourth block (Block 4), and the fifth node (node 5) can generate a fifth block (Block 5). The nodes promoted to producer nodes in the N-th round (e.g. node1-node 5) may lost the promoted status to the producer node at the end of the permission periods, for example, but not limited to, at the end of the N-th round, simultaneously. As illustrated in the exemplary embodiment of FIG. 2, when Block 4 is validated as an approved block in the N-th round, the fifth node (node 5), a node next to the fourth node (node 4) that generated the approved block in the N-th round, can be first promoted in the (N+1)-th round, and be capable of generating Block1 of the (N+1)-th round. And then, the sixth-seventh nodes (nodes 6-7) can be promoted sequentially and generate Block2 and Block 3 of the (N+1)-th round, respectively.

Referring to FIG. 2, a time table in each round may be distinguished from those in the other rounds. In other words, after a particular round is initiated and then the initiated round is terminated, the next round is started. The time interval between rounds may be the same. However, the present disclosure is not limited to this particular setting. For example, the time interval between rounds may be different or variable. Also, a revote round may occur or be defined between the N-th round and the (N+1)-th round. The revote round occurs when the N-th round is in a disagreement state. The revote round may end if the disagreement state is changed to the consensus state. And when the revote round is terminated, the next round, (N+1)-th round, may be initiated. Also, the next round, (N+1)-th round may not be initiated until the revote is terminated.

Multiple permission periods may be defined for each round. A signer node may be promoted to a producer node from the start of a permission period, and the status of the producer node may be maintained until the end of the permission period. The end of the permission period may coincide with the end of the corresponding round. The start of the permission period for each node promotable to the producer node may be different from each other. Therefore, the durations of the status as the producer nodes for each round may be different from each other.

At least some of the plurality of nodes 100 participating in the network may be designated as a signer node 110. And, at least some of signer nodes 110 have the status of promotion to the producer node 120 within a round. In some embodiments, at least some of the signer nodes 110 may be promoted to the producer node 120 according to a predetermined order. For example, the first to the n-th signer nodes 110 may be promoted to the producer node 120 at the start of their permission period according to the order. Therefore, the second signer node may be promoted after the first signer node is promoted, and then the third signer node may be promoted. The nodes promoted in a specific round may lose their promotion status at the same time when the corresponding round is completed. In some embodiments, nodes may be promoted at regular or periodical intervals, but the present disclosure is not limited to the specific operation.

Also, the promotion to the producer node 120 is not limited only to specific signer nodes 110. That is, each and every signer node 110 may be promoted to the producer node 120 throughout the entire rounds.

In the next round, the (N+1)-th round, a signer node next to the node last promoted to the producer node in the N-th round may become the first producer node.

In another aspect, as shown in FIG. 2, a signer node next to the producer node which has generated a candidate block confirmed as an approved block in the N-th round or the producer node may be the first promotable node at the (N+1)-th round. In other words, a node next to the producer node which has generated an approved block of a previous round becomes the first producer node at the next round. This scheme makes it difficult to predict a node to be promoted in the next round, thereby improving system security.

Meanwhile, the timing of promotion to a producer node from a signer node may be determined based on the timestamp of a leader block. Then the signer nodes may determine their promotion timing by using the relative time. According to the absolute time, the signer nodes may have different lists of producer nodes. Also, more producer nodes will be operating as time passes during a round.

Referring to FIG. 3, each block constituting a blockchain may employ a container data structure in which transactions are put together to be included in the blockchain. A block may comprise a header containing metadata and a list of transactions that determines the block size. For example, the size of a block header may be tens of bytes while the average size of a transaction may be at least hundreds of bytes, but the present disclosure is not limited to the specific implementation. Each block may contain hundreds of transactions, but the present disclosure is not limited to the specific implementation.

A block header may include a set of block metadata. The block header may have a hash value of a previous block, which indicates that the current block has been connected to the previous block belonging to the blockchain. Also, the block header may have a timestamp. For instance, the block header may have a Merkle tree route. The Merkle tree route is a data structure used for summarizing the entire transactions within a block in an efficient manner.

A cryptographic hash acting as a digital fingerprint may be used as a main identifier of a block. For example, the cryptographic hash may be obtained by hashing the block header twice through the SHA256 algorithm. The block hash may be used for identifying the corresponding block in a unique and reliable manner, and every node may obtain the block hash value independently by simply hashing the block header. The second method for identifying a block is to recognize the position of the block within a blockchain. In other words, the second method checks or examines the block height. The block height of the first generated block is 0, and the block hash value referenced by the next block points to the first block.

Also, a block header may include voting information of a previous block. In other words, the voting information related to the previous block, which may be confirmed as a finally approved block that has obtaining more than a predetermined number of votes, may be included in the block header of a current block.

The plurality of nodes 100 may generate consensus data, and the consensus data may be propagated among the plurality of nodes 100.

The consensus data may include candidate block data. The candidate block data constitute a candidate block.

The consensus data may include voting data. The voting data constitute voting information.

The consensus data generated for each round may achieve an agreement as the consensus data propagates among the plurality of nodes 100. More specifically, the agreement can be made that one of a plurality of candidate blocks generated for each round is accepted as an approved block. The decision making for the agreement may be conducted by voting of each of the plurality of nodes 100. In other words, a candidate block that obtains the largest number of votes among the plurality of candidate blocks is agreed on as an approved block. Alternatively, a candidate block that has obtained more than a predetermined number of votes is agreed on as an approved block. For example, the number of votes larger than the predetermined number may be as many as ⅔ of the number of nodes eligible for participating in the voting, but the present disclosure is not limited to the specific number. The predetermined number may be preset or varied to more than two-third (e.g. three-fourth (¾)). The approved block agreed on as described above is updated on the blockchain and is connected to the last block on the existing blockchain.

The decision making for reaching a consensus may be carried out according to a predefined consensus rule. If a node, which wants to participate in a blockchain system, accesses the blockchain system, the node downloads a program for operating the blockchain and installs the program on the node itself. And, the program for operating the blockchain may allow the corresponding node to be operated on the blockchain network according to the consensus rule. Therefore, the program for operating the blockchain may be programmed to make the corresponding node operated as one of constituting elements of the blockchain system according to the consensus rule.

Figure 4:
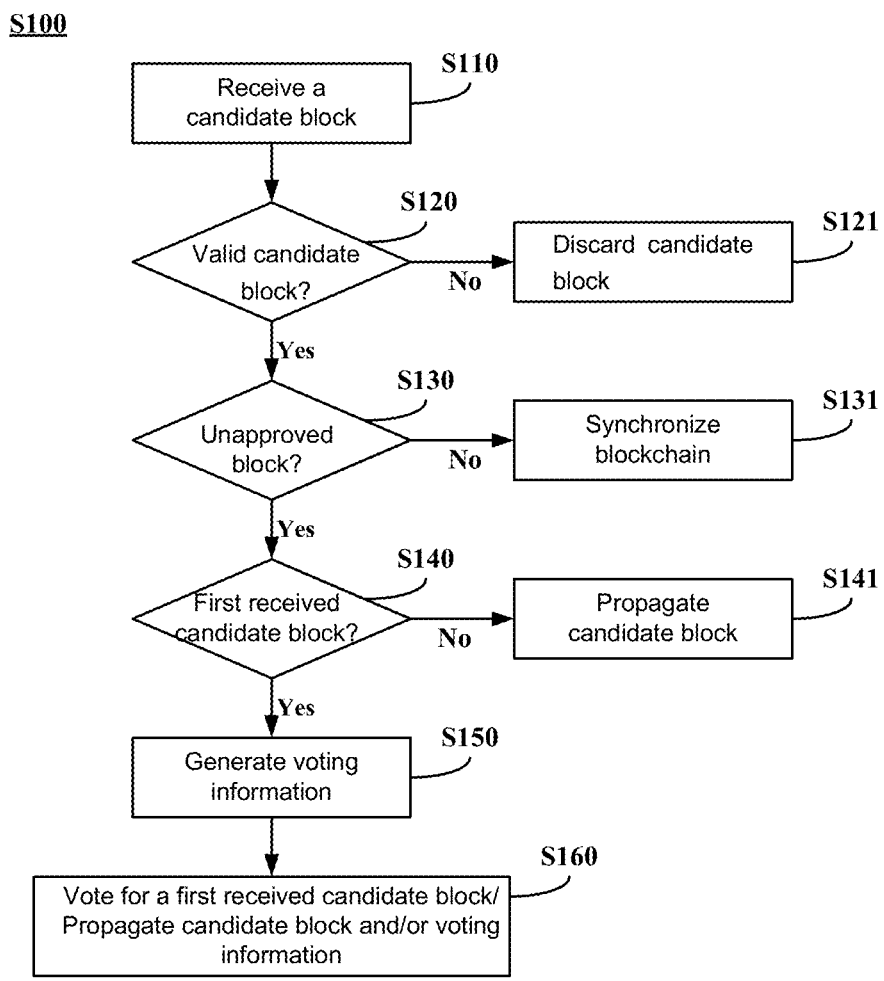
FIG. 4 is a flow diagram illustrating a method for achieving an agreement when a node receives a candidate block from other nodes according to an embodiment of the present disclosure.

FIG. 4 is a flow diagram illustrating a method for achieving an agreement according to an embodiment of the present disclosure. More specifically, FIG. 4 illustrates a method for achieving the agreement when a node receives a candidate block from another or other nodes.

The consensus data received by a node may be candidate block data.

Referring to FIG. 4, in a method S100 for achieving the agreement according to an embodiment of the present disclosure, a node may receive a candidate block (S110), and the node may verify the validity of candidate block data, received at S110, based on the received candidate block data and a blockchain (S120). In other words, the node may determine whether the received candidate block is a valid candidate block. For instance, the node may determine whether another node that generated the received candidate block was in status of a producer node. That is, the node may determine whether a producer node generated the received candidate block. If the received candidate block is not a valid candidate block, the node may discard the received candidate block (S121). Otherwise, the node may accept the received candidate block as a valid candidate block and proceed S130. Alternatively, at S121, the node may discard the received candidate block if the received candidate block is merely a candidate block generated in the past round, and another candidate block generated in the past round (a different candidate block other than the received candidate block) is accepted as an approved block on the blockchain.

If the candidate block received by the node at S110 is accepted as a valid candidate block at S120, the node may determine whether the valid candidate block is an unapproved block (S130). For example, the node determines the existence of a next block that includes a voting result larger than a predetermined number of votes with respect to the valid candidate block.

And, if the node determines that the next block exists at S130, the node accepts the corresponding valid candidate block as an approved block, and requests the synchronization of the corresponding approved block to the distributed network (S131). In some embodiments, if more than ⅔ of the votes are collected with respect to the valid candidate block, and the next block exists, which includes the voting result by regarding the valid candidate block as a parent block, the valid candidate block may be accepted as an approved block.

In another embodiment, if the received candidate block is a block accepted as an approved block in the current round, the node may request the synchronization of the corresponding approved block on the distributed network. In other words, if the received candidate block is an approved block that has obtained a predetermined number of approving votes in the current round, the node may request the synchronization of the corresponding approved block on the network. Moreover, even a node which has not exercised its voting right in the current round (a node which has not received any candidate block before) may receive an approved block approved in the current round. This feature results from the fact that even though a specific candidate block has been already accepted as an approved block in the current round according to the network status (propagation delay and the like), all of the nodes are not allowed to know the existence of the corresponding approved block at the same time.

If a node determines a valid candidate block as an unapproved block at S130, the node may determine whether the valid candidate block is the first received candidate block in the current round (S140). In other words, it may be determined whether the candidate block received by the node in the N-th round (N is a positive integer) is an unapproved block and at the same time, the first received unapproved block in the N-th round.

If the unapproved block is not the first received candidate block, the node may propagate or transmit the unapproved block to other nodes (S141). If the unapproved block is the first received candidate block, the node may generate voting information that approves the first received candidate block (S150). And then the node may propagate or transmit at least one of the first received candidate block and voting information to other nodes (S160).

Meanwhile, each of the nodes may cast its vote once for each round. And, each of the nodes automatically votes only for the candidate block received first in each round. Even if a node which has exercised its voting right in a particular round receives a candidate block again before the next round, and the received candidate block is an unapproved block, the node can not vote again for the corresponding candidate block.

Figure 5:
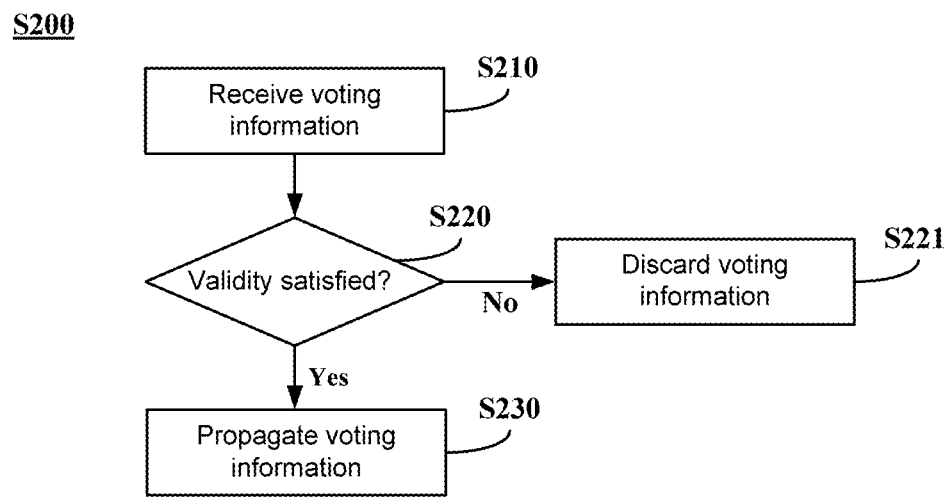
FIG. 5 is a flow diagram illustrating a method for achieving an agreement when a node receives voting information from other nodes according to an embodiment of the present disclosure.

FIG. 5 is a flow diagram illustrating a method for achieving an agreement according to an embodiment of the present disclosure, which describes in which way a blockchain system is operated when a node receives voting information from other node.

Referring to FIG. 5, in a method S200 for achieving an agreement according to an embodiment of the present disclosure, consensus data received by a node may be voting data.

The node may receive voting information including voting data from other node (S210).

The node may verify the validity of the received voting data (S220). In other words, the node may verify the validity of the voting information received from another or other nodes. For example, the node may determine whether the received votes are voting information with respect to a candidate block generated in the current round. If the received votes are voting information with respect to a candidate block generated in the past round, the node may discard the corresponding voting information (S221).

However, if the voting information received by the node is about the votes with respect to a candidate block generated in the current round, the node may propagate the received voting information to other nodes (S230).

Meanwhile, the voting information may include a block number, block hash, timestamp, unique identification information of a signer node, signature information of a node, and revote information. More specifically, in the case of voting information approving a specific candidate block, the block number may indicate a specific candidate block, the block hash may represent a block hash of the specific candidate block. And, the unique identification information of the node and the signature information of the node may be unique identification information and signature information of a node that has approved the specific candidate block. Also, the revote information may be used to distinguish whether voting information has been generated in a revote round.

Figure 6:
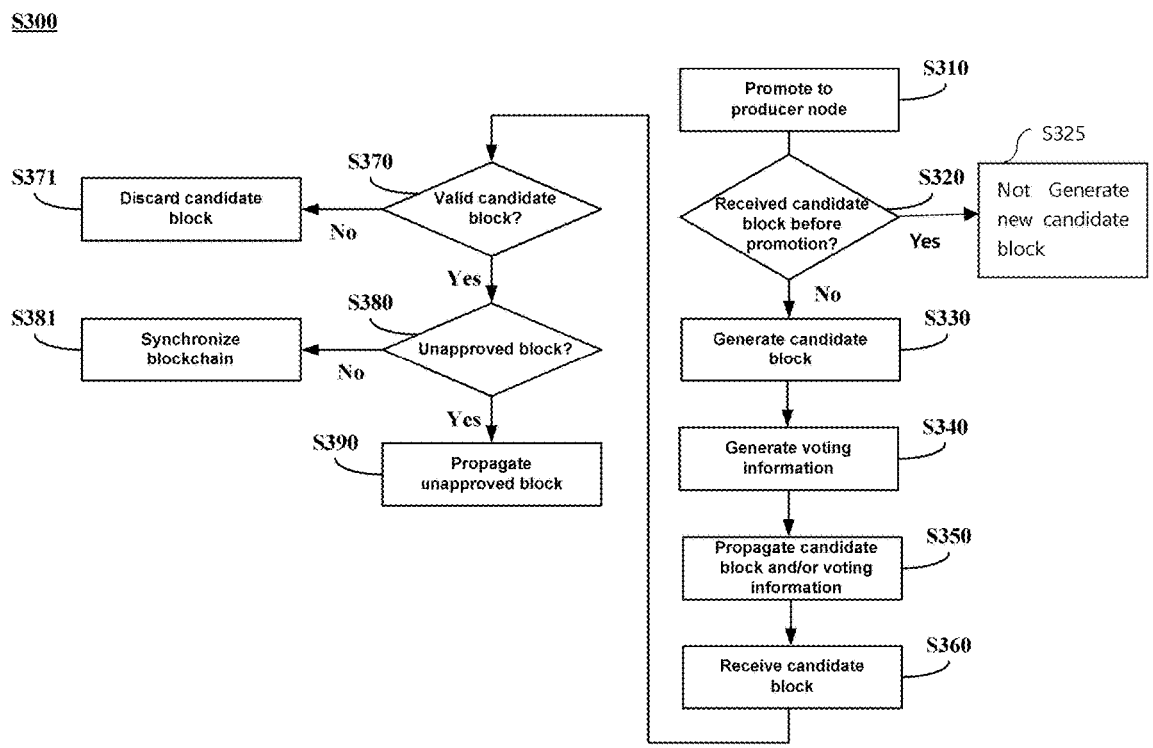
FIG. 6 is a flow diagram illustrating a method for achieving an agreement when consensus data is propagated over a network while a signer node has been promoted to a producer node according to an embodiment of the present disclosure.

FIG. 6 is a flow diagram illustrating a method for achieving an agreement according to an embodiment of the present disclosure. More specifically, FIG. 6 illustrates a method for achieving the agreement when consensus data is propagated on a network while a signer node has been promoted to a producer node.

Referring to FIG. 6, a method S300 for achieving an agreement according to an embodiment of the present disclosure will be described.

During a permission period, a signer node may be promoted to a producer node (S310).

It is determined whether the node promoted to the producer status in the N-th round has received a candidate block before the promotion within the N-th round (S320).

If a candidate block has already been received before the promotion, the producer node may not generate a new candidate block (S325).

However, if a candidate block has not been received before the promotion, the producer node may generate a new candidate block (S330).

In some embodiments, after a signer node is promoted to a producer node, a candidate block may not be generated depending on the network condition. For example, if voting information of a previous block on a blockchain may not be collected or transactions may not be collected due to a computing power problem or other causes, the candidate block may not be generated. Therefore, in certain embodiments, a producer node does not need to necessarily have to generate one candidate block.

While generating a candidate block, the producer node may include or add voting information of an approved block approved in a previous round in or to the newly generated candidate block. Also, the producer node may include transaction records in the new candidate block. In this case, the producer node may include or add transaction records obtained by collecting transaction records within the network in or to the new candidate block.

The producer node may generate voting information that approves a new candidate block (S340). In other words, the producer node automatically performs approval voting that accepts a candidate block generated by the producer node itself as an approval block. Also, if the producer node exercises its voting right as described above, further or additional voting can not be performed unless a revote round is initiated in the corresponding round.

The producer node may propagate at least one of a new candidate block and voting information to other nodes (S350).

Afterwards, if the producer node receives a candidate block from other nodes at S360, the producer node may verify the validity of the received candidate block (S370). The producer node may discard a candidate block of which validity has not been verified (S371).

The producer node may determine whether a valid candidate block of which validity has been verified is an unapproved block (S380). If a valid candidate block is an approved block already approved, the producer node may request other nodes to perform blockchain synchronization (S381).

The producer node may propagate an unapproved block to other nodes (S390).

Figure 7:
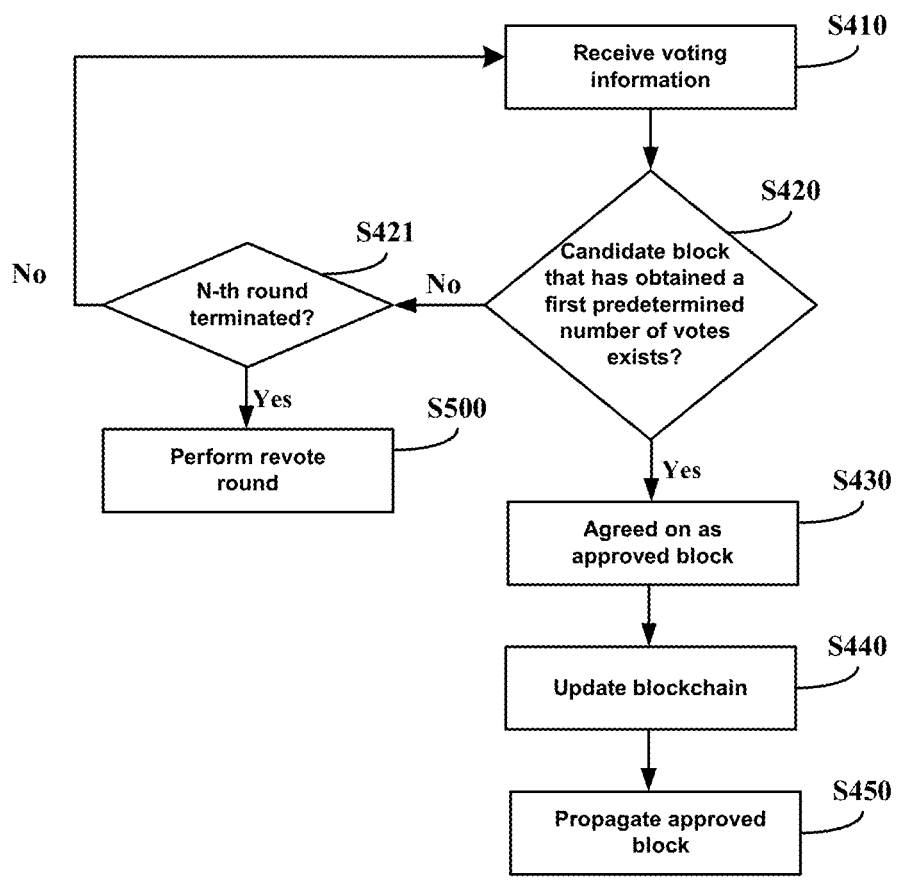
FIG. 7 is a flow diagram illustrating a method for achieving an agreement by accepting a candidate block as an approved block according to an embodiment of the present disclosure.

FIG. 7 is a flow diagram illustrating a method for achieving an agreement according to an embodiment of the present disclosure. More specifically, FIG. 7 illustrates a flow diagram illustrating steps of accepting a candidate block as an approved block by checking the number of votes for candidate blocks.

Referring to FIG. 7, a method for achieving an agreement S400 will be described.

Each of nodes may collect voting information about candidate blocks as voting information is propagated on the network in the N-th round (S410). Each node may check the number of approving votes for each candidate block based on the collected voting information and based on the number of the checked approving votes, determine the existence of a candidate block that has obtained a first predetermined number of votes (S420). Also, since a list of nodes participating in the network is propagated among the nodes, each node is able to calculate the number of votes.

If only part or some of the nodes participating in the network are assigned to signer nodes, and only the corresponding signer nodes have the voting right, the list of the nodes may become a list of signer nodes. Also, the list of the nodes may have information by which nodes may be identified. However, the present disclosure is not limited to the specific case. The list of nodes may be information about the number of nodes having the voting right. Also, the list of nodes may include a list of nodes that may be promoted to producer nodes in the current round. Since a permission period is configured for each round, information about the nodes that may be promoted in each round may be figured out at the start of the corresponding round.

In the N-th round, each node may accept a candidate block that has obtained a first predetermined number of approving votes among the candidate blocks generated in the N-th round as an approved block (S430). And, if a node accepts a candidate block as an approved block, the corresponding candidate block is updated on the blockchain (S440), and the approved block may be propagated in the network (S450).

Alternatively, if each node confirms in the N-th round that one candidate block among the candidate blocks generated in the N-th round has obtained a first predetermined number of approving votes at S420, each node may accept the corresponding candidate block as an approved block (S430) and update the corresponding candidate block on its blockchain (S440). And, the corresponding approved block may be propagated in the network (S450). Here, the candidate block that has obtained the first predetermined number of votes may indicate a candidate block approved by ⅔ of the nodes having the voting right, but the present disclosure is not limited to the first predetermined number above.

In some embodiments, in the S420 step, a node may determine that a candidate block which has obtained the first predetermined number of votes does not exist. In this case, the node may determine whether to terminate the N-th round which is the current round (S421). If it is determined that the N-th round has not been terminated yet, the node continues to receive at least one of voting information and candidate block and thus determines the existence of a candidate block that has obtained the first predetermined number of votes (S420) by using the voting information collected additionally at S410.

Figure 8:
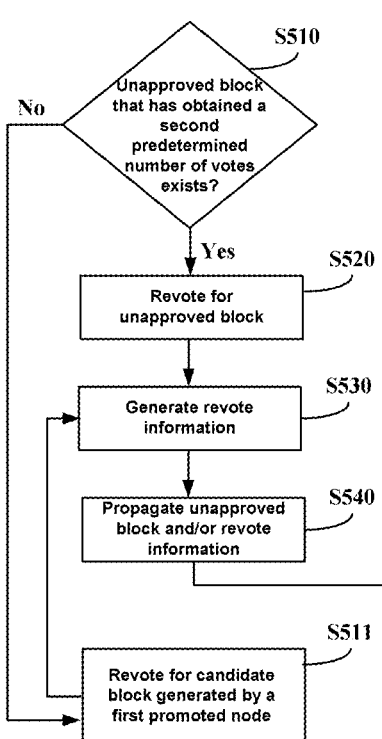
FIG. 8 is a flow diagram illustrating a method for achieving an agreement by a revote round according to an embodiment of the present disclosure.
Figure 8:
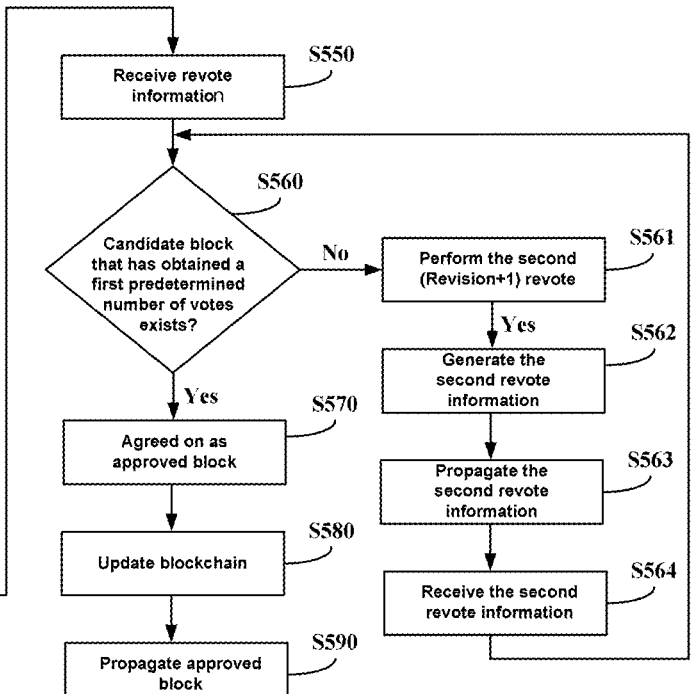

FIG. 8 is a flow diagram illustrating a method for achieving an agreement according to an embodiment of the present disclosure. More specifically, FIG. 8 shows a flow diagram illustrating a revote round.

Referring to FIG. 8, if the N-th round has been terminated, a revote round S500 may be performed.

In the revote round S500, a candidate block having the highest priority may be agreed on as an approved block. In what follows, an example of a candidate block having high priority is described. A candidate block that has obtained the largest number of votes in the current round or a candidate block that has obtained the largest number of votes in a previous revote process out of a plurality of revote processes may have high priority. If the number of votes is the same, higher priority is assigned to the candidate block that has an earlier promotion order to the producer node. In other words, the candidate block generated by a producer node having higher priority may have higher priority.

The (N+1)-th round, which is the next round, is not initiated because of the initiation of a revote round. The (N+1)-th round may be initiated after the revote round is terminated.

While the revote round is in progress, the generation of new candidate blocks may be stopped.

During the revote round S500, each of a plurality of nodes having a voting right may determine the existence of an unapproved block that has obtained a second predetermined number of votes among a plurality of unapproved blocks (S510). However, the determination at S510 may have already been completed at the time of the existence of a candidate block that has obtained the first predetermined number of votes is determined at S420 rather than being performed after the revote round S500 is initiated.

If a candidate block that has obtained the second predetermined number of votes exists, a node may perform first revote (Revision 0) that approves the corresponding candidate block (S520).

Alternatively, during the revote round S500, each of a plurality of nodes having the voting right may determine the existence of an unapproved block that has obtained the largest number of votes among a plurality of unapproved blocks (S510). And, nodes may perform the first revote that approves the candidate block that has obtained the largest number of votes (S520).

A node may generate first revote information according to the first revote (S530), and the first revote information generated may be propagated on the network (S540). Moreover, an unapproved block that has obtained the revote may also be propagated on the network (S540).

Meanwhile, if it is determined from the determination result at the S510 step that an unapproved block that has obtained the second predetermined number of votes does not exist, a revote may be performed for the candidate block generated by the node first promoted in the current round (S511).

Also, a node may receive first revote information from other nodes (S550). The node may verify the validity of the received first revote information. Here, the verification of the validity may refer to confirming the first revote information generated in the current revote round.

The node may determine the existence of a candidate block that has obtained the first predetermined number of votes based on the first revote information generated by the node itself and/or the first revote information received by the node (S560).

In the presence of a candidate block that has obtained the first predetermined number of votes, the corresponding candidate block is accepted as an approved block (S570), the approved block is updated on the blockchain and propagated to other nodes (S580, S590).

If the determination results made by the respective nodes having the voting right are the same with each other, approving votes may be concentrated on a specific candidate block. And, since the corresponding candidate block obtains more than the first predetermined number of approving votes, the corresponding candidate block may be agreed on as an approved block.

Alternatively, determination results of the respective nodes having the voting right may be different from each other. In other words, depending on the network condition, types and amount of consensus data received by the respective nodes may differ from each other. Therefore, for part or some of the nodes, a candidate block that has obtained the second predetermined number of votes (or a candidate block that has obtained the largest number of votes) may differ from each other, and the types of candidate blocks for which a revote is supposed to be performed may differ from each other. If the number of nodes that have made the same determination result is more than the first predetermined number, since the number of votes approving a specific candidate block (a candidate block determined by a plurality of nodes as having obtained more than the second predetermined number of votes or a candidate block determined by a plurality of nodes by having obtained the largest number of votes) also exceeds the first predetermined number, the corresponding candidate block may be finally approved.

In some embodiments, from the determination result of the S560 step, it may be determined that a candidate block that has obtained more than the first predetermined number of votes exists. In this case, a second revote may be initiated.

Each of the nodes may perform the second revote (Revision 1) that approves a candidate block generated by a first promoted node among a plurality of candidate blocks (S561).

Second revote information may be generated according to the second revote (S562), and the second revote information may be propagated on the network (S563).

Each node may receive the second revote information from other nodes (S564). Each node may verify the validity of the second revote information. Here, the verification of validity may refer to confirming the second revote information generated in the current revote round.

In some embodiments, despite the initiation of the second revote, part or some of the nodes may receive first revote information from other nodes depending on the network condition. In this case, since the second revote is currently in progress, the received first revote information may be discarded.

Each node may determine the existence of a candidate block that has obtained the first predetermined number of votes based on the second revote information generated by the node itself and/or received second revote information (S560).

If each node determines he existence of a candidate block that has obtained the first predetermined number of votes, each node accepts the corresponding candidate block as a unique, approved block (S570), updates the candidate block on the blockchain (S580), and propagates the approved block to other nodes (S590).

In some embodiments, it may be determined from the result of the S560 step that there does not exist a candidate block that has obtained the first predetermined number of votes. In this case, the third revote (Revision 2) may be performed (S561 to S564). Even if there does not exist a candidate block that has obtained the first predetermined number of votes despite the repetition of the revote, all of the nodes having the voting right or most of the nodes except for a few nodes depending on the network condition gradually share the consensus data over time. Therefore, since the nodes sharing the consensus data are allowed to know the existence of a candidate block generated by the first promoted node among a plurality of candidate blocks and approve the corresponding candidate block, an agreement on the approved block, which is a unique block among various candidate blocks, is finally achieved.

Meanwhile, a specific node may be shut down and separated from the blockchain network. And, synchronization may be started, where a specific node participates the blockchain network and receives blocks from neighboring nodes. A signer node may participate in the voting according to the consensus data that the node has. During the process above, voting information may be treated as multiple votes or discarded as a past vote. And, a newly participating node may put priority in the revote round currently in progress and first acknowledge a vote that has arrived at the node itself. Also, a newly participating node may participate in the agreement process from the start of the next revote (when revote is performed multiple times within a revote round, the time the revote at the time of participation is terminated, and the next revote is performed). In some embodiments, if a revote is in progress when a newly participating node participates in the revote, and an approved block is agreed on through the corresponding revote, the newly participating node may participate in the agreement for accepting a new approved block in the next round at the start of the different round.

Also, the blockchain system may detect a Byzantine node and exclude the Byzantine node from the agreement process for a predetermined time period. For example, if a producer node generates a plurality of candidate blocks within one round, the corresponding producer node may be excluded from the agreement process. In some embodiments, a candidate block generated by the node detected as a Byzantium node may be excluded from the voting.

Also, in some embodiments, in the revote round, only when a block matching the block hash recorded in a vote has been collected, the collected voting information with respect to the corresponding block may be treated as a valid vote.

Also, a group possessing the largest number of votes having the same block hash may become a major group.

Also, the first revote in a revote round may be distributed as Revision 0, and afterwards, (Revision +1) may take place whenever a revote such as the second and third voting is performed. A blockchain system according to an embodiment may be configured to start a revote of Revision N after ⅔ of the votes from Revision N−1 are collected. And if as many as ⅔ of the votes from Revision N−1 may not be collected even after a considerable time passes, it may indicate that the collection of ⅔ of the votes has been terminated before the Revision N−1.

Also, if it is determined that a revote is needed at the time ⅔ of the votes from Revision N have been collected, a node may vote for Revision N+1 by using a block of the major group selected by the node itself as a leader block.

Also, if a revote process is started, block generation may be stopped until the voting is terminated. Since more than 4/3 votes have been identified, it may be regarded that an honest node has a block in addition to the Byzantine node. However, if there does not exist a candidate block to be selected due to the detection of cheating, a participating node that has not generated a block yet may generate an additional block.

Also, the branch derivation of a blockchain due to a producer node as the Byzantine node will be described. If the Byzantine node distributes different normal blocks to the respective producer nodes, each participating node may select a different block as a major block and may suspect that the network enters the stop-the-world state. Since each node propagates a block and voting information received by the node itself to its surroundings again, other nodes may also recognize that the branch derivation has occurred. If the generation of a plurality of candidate blocks in one round is detected, a producer node of the corresponding block receives a penalty that excludes the block from candidates. Since the voting is performed for the remaining blocks, the producer node that has attempted the branch derivation may be culled naturally.

Also, multiple voting of a signer node as the Byzantine node will be described. The description below is related to the case when Byzantine nodes conduct multiple voting and the total number of votes of a blockchain network exceeds 100%. In this case, a plurality of candidate blocks that obtain more than ⅔ of the votes may be generated. First, since the voting is all performed for normal blocks, it may not matter which block is selected as an approved block. And in the case of a block generated by the Byzantine node that does not hold the producer status, the block is already discarded in the validity verification step of the block.

Figure 9:
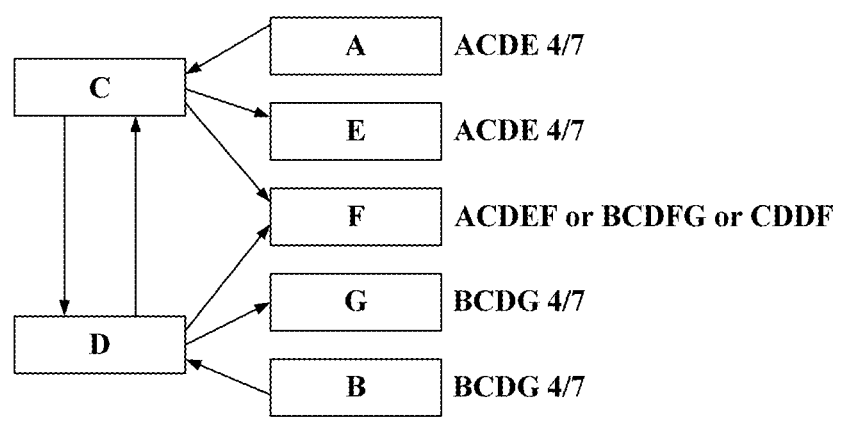
FIG. 9 illustrates an example of multiple voting of a Byzantine signer node.

Also, referring to FIG. 9, if A and B generate a block, and C and D are Byzantine nodes under 3N+1 condition (among 7 signer nodes (A, B, C, D, E, F and G), two are Byzantine nodes), both of C and D approve all of A and B blocks, an approval for A block is given to A and E, and an approval for B block is given to B and G. Although A and E are recognized as having obtained A, C, D and E (4 votes), B and G are recognized as having obtained B, C, D and G (4 votes), the blocks are not able to satisfy the condition of 5 votes without F. If F belongs to any one of the groups, the corresponding group may be selected as an approved group.

Some embodiments of the present disclosure may be implemented in the form of program commands which may be executed through various types of computer elements and recorded in a computer-readable recording medium. In other words, a method for achieving an agreement among a plurality of nodes executed by at least one processor of a blockchain system composed of or including a distributed network of the plurality of nodes may be implemented in the form of program commands and recorded in a computer-readable recording medium. Also, a method for achieving an agreement among a plurality of nodes executed by at least one processor of a blockchain system composed of a distributed network of the plurality of nodes may be implemented in the form of program commands and recorded in a computer-readable recording medium. The computer-readable recording medium may include program commands, data files, and data structures separately or in combination thereof. The program commands recorded in the computer-readable recording medium may be designed and composed specifically for the present disclosure or may be commonly available for those skilled in the field of computer software. Examples of a computer-readable recoding medium may include magnetic media such as hard-disks, floppy disks, and magnetic tapes; optical media such as CD-ROMs and DVDs; magneto-optical media such as floptical disks, and hardware devices specially designed to store and execute program commands such as ROM, RAM, and flash memory. Examples of program commands include not only machine codes such as those generated by a compiler but also high-level language codes which may be executed by a computer through an interpreter and the like. The hardware device may be composed to be operated by one or more software modules to perform the operations of the present disclosure, and vice versa.

Specific implementation of the present disclosure are embodiments, which does not limit the technical scope of the present invention in any way. For the clarity of the specification, descriptions of conventional electronic structures, control systems, software, and other functional aspects of the systems may be omitted. Also, connection of lines between constituting elements shown in the figure or connecting members illustrate functional connections and/or physical or circuit connections, which may be replaceable in an actual device or represented by additional, various functional, physical, or circuit connection. Also, if not explicitly stated otherwise, "essential" or "important" elements may not necessarily refer to constituting elements needed for application of the present invention.

Also, although detailed descriptions of the present invention have been given with reference to preferred embodiments of the present invention, it should be understood by those skilled in the corresponding technical field or by those having common knowledge in the corresponding technical field that the present invention may be modified and changed in various ways without departing from the technical principles and scope specified in the appended claims. Therefore, the technical scope of the present invention is not limited to the specifications provided in the detailed descriptions of this document but has to be defined by the appended claims.

According to an embodiment of the present disclosure, a unique leader election problem for each round in the conventional leader model and a problem when the elected leader is a malicious leader may be resolved.

Also, according to an embodiment of the present disclosure, a side chain may be prevented from being generated, and finality may be guaranteed.

Also, according to an embodiment of the present disclosure, network resources may be utilized efficiently, and a fast transaction approval may be obtained.

Also, according to an embodiment of the present disclosure, a blockchain system may be robust to a direct attack of a network attacker against signer nodes.

Also, according to an embodiment of the present disclosure, a blockchain system may be capable of managing producer nodes through the concepts of a round and a permission period over time.

Also, according to an embodiment of the present disclosure, each signer may perform voting and block generation asynchronously based on relative time instead of using a consensus algorithm based on a timeout scheme heavily influenced by the network propagation delay, a block may be forced to be determined within one round, and thereby no limit may be imposed on the relative time for the round, and a fast agreement is reached by not electing a unique producer node.

Also, according to an embodiment of the present disclosure, a malicious leader problem may be resolved through a block generator contention method.

Also, according to an embodiment of the present disclosure, a consensus algorithm may be optimized for a consortium or private environment.

Also, according to an embodiment of the present disclosure, a problem that a blockchain system is halted when a producer node neglects to generate blocks may be resolved by using a method for generating a producer node during a permission period for each round; and a large amount of block generators from being existed may be prevented.

The technical effects of the present disclosure are not limited to the technical effects described above, and other technical effects not mentioned herein may be understood from the description below.

What is claimed is:

1. A method for achieving an agreement among a plurality of nodes connected to a distributed network of a blockchain system, the method comprising:
   receiving a candidate block in one round of a plurality of rounds by one node among a plurality of nodes able to be promoted to producer nodes, wherein each of the producer nodes is capable of generating a block for a predetermined time period for each round;
   determining, by the one node, whether the received candidate block is a valid candidate block;
   determining, by the one node, whether the received candidate block determined as the valid candidate block is an unapproved block; and
   determining, by the one node, whether to vote for approval of the received candidate block determined as the unapproved block by determining whether the received candidate block determined as the unapproved block is a first received candidate block which is a candidate block first received by the one node within the one round.

2. The method of claim 1, further comprising:
   transmitting, by the one node, the received candidate block determined as the unapproved block to another or other of the plurality of nodes; and
   transmitting, by the one node, voting information that approves the first received candidate block to another or other of the plurality of nodes.

3. The method of claim 2, further comprising accepting an unapproved block that has obtained more than a predetermined number of votes as an approved block among unapproved blocks generated in the one round.

4. The method of claim 3, wherein nodes promoted to the producer nodes in the one round lose a producer node status before or when a next round subsequent to the one round is started, and a node subsequent to a node that has generated a candidate block accepted as the approved block at the one round is promoted to a first producer node in the next round.

5. The method of claim 2, further comprising:
   initiating a revote round when an unapproved block that obtains more than a predetermined number of votes does not exist among a plurality of unapproved blocks in the one round; and
   performing a revote for the plurality of unapproved blocks according to one or more predetermined priorities during the revote round, wherein a new candidate block is not generated during the revote round.

6. The method of claim 5, wherein the performing the revote includes performing the revote by a plurality of nodes eligible for voting to approve an unapproved block that has obtained more than the predetermined number of the votes among the plurality of unapproved blocks.

7. The method of claim 6, wherein the performing the revote further comprises, when a plurality of unapproved blocks have obtained more than the predetermined number of the votes, performing a revote for approval of an unapproved block generated by a first promoted node among nodes that have generated the plurality of unapproved blocks respectively, wherein the first promoted node is a node with the earliest order of promotion to the producer node in the one round.

8. The method of claim 1, wherein the determining whether the received candidate block is the valid candidate block includes:
   determining, by the one node, whether to promote another node that has generated the received candidate block; and
   when the received candidate block is a block that a promoted node has generated, accepting the received candidate block as the valid candidate block.

9. The method of claim 1, wherein the determining whether the received candidate block determined as the valid candidate block is the unapproved block includes:
   determining presence or absence of a subsequent block with a voting result having more than a predetermined number of votes for the valid candidate block; and
   in the presence of the subsequent block, accepting the received candidate block, determined as the valid candidate block, as an approved block and requesting the distributed network to perform synchronization with the approved block.

10. The method of claim 1, wherein the plurality of nodes able to be promoted to the producer nodes are promoted according to a predetermined order at each round.

11. The method of claim 3, wherein the predetermined number is preset as more than two-thirds (⅔) of the number of the plurality of nodes.

12. The method of claim 4, wherein the predetermined number is preset as more than two-thirds (⅔) of the number of the plurality of nodes.

13. The method of claim 2, wherein each of the plurality of nodes has a one-time voting right for each round.

14. The method of claim 2, further comprising:
   receiving, by another node of the plurality of nodes, the voting information;
   verifying, by the another node, validity of the received voting information; and
   propagating, by the another node, the verified voting information to other nodes of the plurality of nodes.

15. The method of claim 2, further comprising:
   when one of the plurality of nodes receives the voting information while a specific round is in progress, determining whether a candidate block that has obtained more than a predetermined number of votes exists; and
   when the candidate block that has obtained the predetermined number of the votes exists, making a consensus that an unapproved block that has obtained the predetermined number of the votes is accepted as an approved block.

16. A method for achieving an agreement among a plurality of nodes connected to a distributed network of a blockchain system, the method comprising:

promoting one node to a producer node among a plurality of nodes able to be promoted to producer nodes in one round of a plurality of rounds, wherein each of the producer nodes is capable of generating a block for a predetermined time period for each round;

determining whether the one node promoted as the producer node receives a candidate block before the one node is promoted within the one round;

when the one node promoted as the producer node does not receive the candidate block before being promoted, generating a candidate block including voting information in a last block of a blockchain to which a new block is to be connected;

voting for accepting the generated candidate block as an approved block; and transmitting the generated candidate block and the voting information to other nodes.

17. The method of claim 16, wherein, when the one node promoted as the producer node receives the candidate block before being promoted, the one node promoted as the producer node does not generate the new block.

18. The method of claim 16, wherein the new block is a block able to be agreed on as the approved block based on the number of votes with respect to voting for approving the new block as the approved block in the one round.

19. The method of claim 16, further comprising:

receiving, by the one node promoted as the producer node in the one round, a candidate block generated by another node;

determining whether the candidate block generated by the another node is a valid candidate block;

determining whether the candidate block determined as the valid candidate block is an unapproved block; and transmitting the candidate determined as the unapproved block to the other nodes.

20. The method of claim 16, wherein the plurality of nodes able to be promoted to the producer nodes are promoted according to a predetermined order at each round.

* * * * *